United States Patent
Eckhoff et al.

(10) Patent No.: US 9,587,540 B2
(45) Date of Patent: Mar. 7, 2017

(54) METHOD AND DEVICE FOR REACTIVATING EXHAUST-GAS PURIFICATION SYSTEMS OF DIESEL ENGINES WITH LOW-PRESSURE EGR

(75) Inventors: Stephan Eckhoff, Alzenau (DE); Stefan Franoschek, Nettetal (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 14/125,692

(22) PCT Filed: Jun. 22, 2012

(86) PCT No.: PCT/EP2012/062138
§ 371 (c)(1),
(2), (4) Date: Jan. 15, 2014

(87) PCT Pub. No.: WO2013/007497
PCT Pub. Date: Jan. 17, 2013

(65) Prior Publication Data
US 2014/0123630 A1 May 8, 2014

(30) Foreign Application Priority Data
Jul. 13, 2011 (DE) .......... 10 2011 107 692

(51) Int. Cl.
*F01N 3/00* (2006.01)
*F01N 3/10* (2006.01)
(Continued)

(52) U.S. Cl.
CPC .............. *F01N 3/10* (2013.01); *F01N 3/035* (2013.01); *F01N 3/103* (2013.01); *F01N 3/2006* (2013.01);
(Continued)

(58) Field of Classification Search
CPC ... F02M 25/0718; F01N 2430/06; F01N 3/10; F01N 3/2006; F02D 41/0055
(Continued)

(56) References Cited

U.S. PATENT DOCUMENTS 4,961,917 A   10/1990   Byrne
5,974,794 A   11/1999   Gotoh et al.
(Continued)

FOREIGN PATENT DOCUMENTS

DE   39 40 758 A1   6/1991
DE   44 35 073 A1   4/1995
(Continued)

OTHER PUBLICATIONS

International Search Report for PCT/EP2012/062138; mailed Apr. 12, 2012.
(Continued)

*Primary Examiner* — Audrey K Bradley
*Assistant Examiner* — Jason Sheppard
(74) *Attorney, Agent, or Firm* — Smith, Gambrell & Russell, LLP

(57) ABSTRACT

The invention relates to a method for reactivating a system composed of an oxidation catalytic converter (5) followed by a possibly catalytically coated particle filter (6), and to a correspondingly adapted exhaust-gas purification system for lean-burn engines (1) with low pressure EGR (14). The present invention relates in particular to the reactivation of such a system during overrun operation of the engine.

23 Claims, 1 Drawing Sheet

Figure 1:
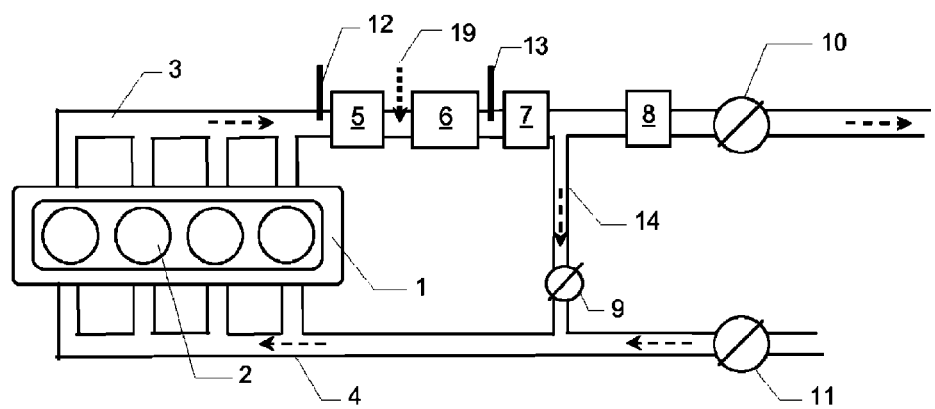

(51) Int. Cl.
 *F01N 3/035* (2006.01)
 *F01N 3/20* (2006.01)
 *F01N 9/00* (2006.01)
 *F01N 13/00* (2010.01)

(52) U.S. Cl.
 CPC ............ *F01N 9/00* (2013.01); *F01N 13/009* (2014.06); *F02M 26/05* (2016.02); *F02M 26/06* (2016.02); *F02M 26/15* (2016.02); F01N 2240/36 (2013.01); F01N 2250/12 (2013.01); F01N 2430/06 (2013.01); F01N 2560/02 (2013.01); F01N 2560/14 (2013.01); F01N 2570/14 (2013.01); F01N 2610/02 (2013.01); F01N 2610/03 (2013.01); F01N 2900/08 (2013.01); F01N 2900/1402 (2013.01); Y02T 10/22 (2013.01); Y02T 10/26 (2013.01); Y02T 10/47 (2013.01)

(58) Field of Classification Search
 USPC .......................................................... 60/297
 See application file for complete search history.

(56) References Cited

U.S. PATENT DOCUMENTS

| | | | |
|---|---|---|---|
| 6,082,100 | A | 7/2000 | Boegner et al. |
| 6,276,130 | B1 | 8/2001 | Ito et al. |
| 6,756,336 | B2 | 6/2004 | Kasahara et al. |
| 6,767,855 | B2 * | 7/2004 | Kasahara et al. ............... 502/66 |
| 6,978,601 | B1 | 12/2005 | Twigg |
| 7,313,911 | B2 | 1/2008 | Pfeifer et al. |
| 7,717,099 | B2 * | 5/2010 | Nagae et al. ............ 123/568.21 |
| 8,245,499 | B2 * | 8/2012 | Vigild ................ F02D 41/0065 60/274 |
| 8,475,753 | B2 | 7/2013 | Eckhoff et al. |
| 2002/0038654 | A1 | 4/2002 | Sasaki et al. |
| 2002/0081238 | A1 | 6/2002 | Duvinage et al. |
| 2002/0104312 | A1 | 8/2002 | Hoffman et al. |
| 2004/0050375 | A1 | 3/2004 | Arnold |
| 2008/0134648 | A1 | 6/2008 | Duvinags et al. |
| 2009/0019836 | A1 | 1/2009 | Nagaoka et al. |
| 2009/0038308 | A1 | 2/2009 | Nagae |
| 2009/0093796 | A1 | 4/2009 | Pfeffer et al. |
| 2010/0018187 | A1 | 1/2010 | Matsumoto et al. |
| 2011/0000189 | A1 | 1/2011 | Mussmann et al. |
| 2011/0072791 | A1 * | 3/2011 | Bidner ................... B60K 6/485 60/278 |
| 2011/0072801 | A1 * | 3/2011 | Lupescu et al. ................ 60/287 |
| 2011/0120093 | A1 | 5/2011 | Eckhoff et al. |
| 2011/0131949 | A1 * | 6/2011 | Adams et al. .................. 60/274 |
| 2011/0277450 | A1 | 11/2011 | Hoyer et al. |
| 2012/0148464 | A1 | 6/2012 | Eckhoff et al. |
| 2012/0240557 | A1 * | 9/2012 | Kawaguchi et al. ........... 60/278 |
| 2014/0090362 | A1 | 4/2014 | Eckhoff et al. |

FOREIGN PATENT DOCUMENTS

| | | |
|---|---|---|
| DE | 196 14 540 A1 | 10/1997 |
| DE | 196 36 790 | 3/1998 |
| DE | 197 16 275 | 9/1998 |
| DE | 197 53 738 A1 | 6/1999 |
| DE | 103 08 288 A1 | 9/2004 |
| DE | 103 35 785 A1 | 3/2005 |
| DE | 10 2005 056955 | 5/2007 |
| DE | 10 2007 039249 | 2/2009 |
| DE | 10 2007 060623 | 6/2009 |
| DE | 10 2009 039 249.1 | 8/2009 |
| DE | 10 2009 039 250.5 | 8/2009 |
| DE | 102008015600 A1 | 10/2009 |
| DE | 10 2008 048854 | 4/2010 |
| EP | 0 427 970 A2 | 5/1991 |
| EP | 0 800 856 A2 | 10/1997 |
| EP | 0 829 623 A1 | 3/1998 |
| EP | 0 869 267 | 10/1998 |
| EP | 0913559 A2 | 5/1999 |
| EP | 1 001 154 | 5/2000 |
| EP | 1 026 385 | 8/2000 |
| EP | 1 046 423 A2 | 10/2000 |
| EP | 0 872 633 | 3/2002 |
| EP | 1227232 A2 | 7/2002 |
| EP | 1 398 069 B1 | 4/2006 |
| EP | 1 837 497 A1 | 9/2007 |
| EP | 1 309 775 B1 | 6/2008 |
| EP | 1 663 458 B1 | 1/2009 |
| EP | 2 042 225 A1 | 4/2009 |
| EP | 2 042 226 A2 | 4/2009 |
| EP | 2 112 339 | 10/2009 |
| EP | 2 123 345 B1 | 8/2010 |
| EP | 2 283 213 | 2/2011 |
| JP | H06-257519 | 9/1994 |
| JP | 2006-200362 A | 8/2006 |
| WO | 95/35152 A1 | 12/1995 |
| WO | 01/19500 A1 | 3/2001 |
| WO | 2004/076829 A1 | 9/2004 |
| WO | 2007/137675 A1 | 12/2007 |
| WO | 2008/101585 A1 | 8/2008 |
| WO | 2008/106523 A2 | 9/2008 |
| WO | 2008/122866 | 10/2008 |
| WO | 2009/129903 | 10/2009 |
| WO | 2011/023332 | 3/2011 |

OTHER PUBLICATIONS

International Search Report for Application No. PCT/EP2012/058547 dated Sep. 25, 2012 (in English).
"Development of New Concept Three-Way Catalyst for Automotive Lean-Burn Engines" N. Miyoshi et al, SAE paper 950809, 1995.
Theis, Joseph R. & McCabe, Robert W. "Effect of Lean Operation on the HC Activity of Three-Way Catalysts". 22nd North Am. Catal. Soc. Meeting, 2011. 1 Page.
Eckhoff, S. (dissertation) "Untersuchungen zur katalytischen Aktivität eines Diesel-DeNOx—Katalysators auf der Basis von Pt/Al$_2$O$_3$" ["Investigation on the Catalytic activity of a diesel-DeNOx-catalyst based on Pt/Al$_2$O$_3$"], 1998. pp. 1-149.
Hauptmann, W., Votsmeier, M. Gieshoff, J, Drochner, A. & Vogel, H. "Inverse hysteresis during the NO oxidation on Pt under lean conditions". Applied Catalysis B: Environmental 93, 2009, pp. 22-29.
Engler, B., Koberstein, E & Voler, H. "Catalytically Activated Diesel Particulate Traps—New Development and Applications", 1986, SAE Technical Paper Series 860007. 1986. pp. 1-9.
International Preliminary Report on Patentability for PCT/EP2012/062138 dated Jan. 14, 2014.
Written Opinion for PCT/EP2012/062138 dated Jan. 13, 2014.

* cited by examiner

METHOD AND DEVICE FOR REACTIVATING EXHAUST-GAS PURIFICATION SYSTEMS OF DIESEL ENGINES WITH LOW-PRESSURE EGR

The invention relates to a method for reactivating a system composed of an oxidation catalytic converter (DOC) followed by a possibly catalytically coated particle filter (DPF), and to a correspondingly adapted exhaust-gas purification system for lean-burn engines. The present invention relates in particular to the reactivation of such a system during particular driving situations of the vehicle.

The emissions contained in the exhaust gas of a motor vehicle may be divided into three groups. The expression "primary emissions" refers to harmful gases which are generated directly in the engine by the combustion process of the fuel and which are present in the so-called untreated exhaust gas at the cylinder outlet. The untreated exhaust gas of lean-burn engines contains for example not only the normal primary emissions carbon monoxide (CO), hydrocarbons (HC) and nitrogen oxides ($NO_x$) but also a relatively high oxygen content of up to 15% by volume. Furthermore, there may also be particle emissions which are composed predominantly of soot residues and possibly organic agglomerates and which arise from partially incomplete fuel combustion in the cylinder.

The harmful gases carbon monoxide and hydrocarbons may, from lean exhaust gas, be made relatively non-harmful by oxidation on a suitable noble-metal-containing oxidation catalyst (DE10308288, DE19614540, DE19753738, DE3940758, EP427970, DE 4435073). In the field of exhaust-gas aftertreatment of motor vehicles, wall-flow filters are often used for the reduction of particles, in particular in diesel vehicles. Such filters may be used uncoated or with a catalytic coating. Catalytic coatings are common in the form of oxidation catalysts which can effect an oxidation of hydrocarbons and CO and can possibly oxidize nitrogen monoxide (NO) to form nitrogen dioxide ($NO_2$) (Catalytically Activated Diesel Particular Traps, Engler et al., 1985, SAE850007). Consideration is however also increasingly being given to the coating of particle filters with other catalytically active materials (DE102009039250; DE102009039249; EP1309775 for filters with an oxidation-catalyzing coating; EP2042225, EP2042226, US2009093796 for filters coated with three-way catalyst materials; EP1837497 or EP1398069 for filters coated with NOx storage catalysts; WO08106523 and EP1663458 for filters coated with SCR catalysts).

Future exhaust gas legislation limits the amount of hydrocarbons and CO in the exhaust gas of diesel engines to such an extent that large amounts of noble metals are required on the diesel oxidation catalytic converters. For European applications, for exhaust-gas aftertreatment, use is presently made of a system composed of a close-coupled diesel oxidation catalytic converter (DOC) followed by a filter with an oxidation-catalyzing coating (cDPF).

Likewise envisaged, however, is an increased reduction of nitrogen oxides in the exhaust gas of diesel engines. This demand is met either through the use of exhaust-gas recirculation systems or engine-internal measures, through the use of NOx aftertreatment systems, or through a combination of said options.

In all external exhaust-gas recirculation systems, there must be a pressure gradient from the exhaust-gas side to the fresh-air side (intake air) in order to permit the flow of the exhaust gas from the exhaust-gas side to the intake air side. This means that exhaust-gas recirculation is possible only in those engine rotational speed/load ranges in which at least this condition is met. In high-pressure (HP) EGR systems, the exhaust gas is extracted upstream of the turbine of the turbocharger and supplied to the fresh air to the engine downstream of the compressor of the turbocharger. In low-pressure (LP) EGR systems, the exhaust gas is extracted downstream of the turbine and is supplied to the fresh air upstream of the compressor of the turbocharger (DE 102005056955). LP EGR systems permit exhaust-gas recirculation over a broader characteristic map range and with higher recirculation rates than HP EGR systems. To protect the turbine and the fresh-air path in LP EGR systems against depositions of soot and hydrocarbons, the exhaust gas is generally extracted downstream of a particle filter. Combinations of both systems (HP and LP) are likewise known (JP 6257519, US 2004050375).

For NOx aftertreatment, NOx storage catalytic converters and SCR catalytic converters are available. SCR catalytic converters are well known to a person skilled in the art (WO2007/137675, U.S. Pat. No. 4,961,917, DE10335785). NOx storage catalytic converters are also sufficiently well known to a person skilled in the art. DE102009039249 and DE102008048854 present nitrogen oxide storage catalytic converters which are preferably used, and WO2011/023332 relates generally to storage materials which are advantageous for the invention.

Modern diesel engines are optimized for low fuel consumption and often comprise a turbocharger and exhaust-gas recirculation systems for engine-internal reduction of NOx emissions. These considerably reduce the exhaust-gas temperature in relation to older diesel engines. Low exhaust-gas temperatures however considerably reduce the efficiency of the catalytic converters.

It is known that oxidation catalytic converters lose activity in lean-burn driving operation, in particular in the case of high exhaust-gas temperatures such as may arise for example during the filter regeneration. Said loss in activity is caused primarily by the sintering of the catalytically active noble metals (for example Pt and Pd). Under reducing conditions (lambda less than or equal to 1), said catalytic converters can however be reactivated ("Untersuchungen zur katalytischen Aktivität eines Diesel-DeNOx-Katalysators auf der Basis von Pt/Al2O3" ["Tests regarding the catalytic activity of a diesel DeNOx catalytic converter based on Pt/Al2O3"], dissertation by S. Eckhoff 1998. Lit.: Appl. Catal. B: Environ. 93 (2009) pages 22-29; 22nd North Am. Catal. Soc. Meeting, 2011, Poster, J. R. Theis, Ford). Said reducing conditions must be present only for a short time—similarly to the regeneration of NOx storage catalytic converters. This means that, under said conditions, the activity, for example the light-off temperature, of the catalytic converter is shifted toward lower temperatures in relation to the activity after purely lean-burn operation.

Efficient reactivation of a diesel oxidation catalytic converter is normally only possible at temperatures above 200° C. In the New European Driving Cycle (NEDC), this means that, in the case of modern diesel engines, reactivation first becomes possible within the extra-urban part at the end of the driving cycle, because it is here that the exhaust-gas temperatures required for the reactivation are reached for the first time. It would however be desirable to also be able to carry out a reactivation already at low temperatures (urban) in order to be able to ensure effective exhaust-gas aftertreatment even during relatively long journeys at low speeds. At present, it is therefore necessary in these driving situations to heat up the exhaust system for the reactivation in order to be able to carry out an effective reactivation, which inevitably entails an increase in fuel consumption and also an increase in HC/CO emissions.

It was therefore the problem addressed by the present invention to specify a method and a system for the exhaust-gas purification of an internal combustion engine operated predominantly under lean-burn conditions, with which method and system the oxidation catalytic converter (DOC) can be reactivated even at low temperatures, and therefore even in driving situations in which the exhaust-gas temperature is actually too low, without the need for special heating of the exhaust-gas purification system. Here, the method and the system should be superior to the corresponding measures known from the prior art from an economic and ecological aspect, that is to say should inter alia also be able to adhere to future exhaust-gas limit values.

These and further problems, which are not mentioned here but which emerge in an obvious manner to a person skilled in the art from the prior art, are achieved by means of a regeneration method and a system according to independent Claims 1 and 10. Preferred embodiments of the method and of the system can be found in the subclaims dependent on claims 1 and 10 respectively.

Since it is provided that, in a method for reactivating a diesel oxidation catalytic converter (DOC) (5) which is not capable of storing nitrogen oxides and which is arranged in the exhaust line (3) of a lean-burn engine (1) and which is followed by a possibly catalytically active particle filter ((c)DPF) (6), wherein the engine (1) is provided with a device for low-pressure exhaust-gas recirculation, and possibly a device for reducing the exhaust-gas discharge (10) and/or a device for reducing the intake air (11), and wherein a low-pressure EGR valve (9) is arranged in the low-pressure EGR line (14), the reactivation is carried out during overrun operation of the engine, in such a way that, with throttling of the intake air by means of the valve (11) and/or reduction of the discharge of the exhaust gases by means of the valve (10), the exhaust gas is substantially conducted in a circuit through the low-pressure EGR valve (9) via the engine (1) and the diesel oxidation catalytic converter (5) and the particle filter (6), and during this time an air-fuel mixture is set which corresponds to a lambda value of ≤1, one arrives in an extremely surprising but no less advantageous manner at the solution to the stated problem.

Depending on the duration of the overrun operation, it is duly possible that the reactivation will take considerably longer (5-20 s) with a high low-pressure EGR fraction than in the case of a normal reactivation (3-5 s). Here, however, no large amounts of HC/CO are emitted. Since the exhaust gas is conducted in a circuit and is therefore brought into contact with the catalytic converter several times, the efficiency of the exhaust-gas recirculation can be increased considerably. As a result, the DOCs are regenerated more efficiently even at relatively low exhaust-gas temperatures, which ultimately may also help in reducing noble metal costs. Furthermore, the exhaust system will cool down less during the overrun operation with a high low-pressure EGR fraction than under normal overrun operation, in which the cold intake air is conducted, without combustion, directly through the engine and across the catalytic converters, which has the result inter alia that, upon the resumption of load operation of the engine, the catalytic converter may, despite reactivation, have been cooled down to below its activity temperature.

The DOC (5) may be configured as desired by a person skilled in the art. The oxidation catalytic converter (5) has an oxidative action or activity. "Oxidizing action or activity" is to be understood generally to mean that the oxidizable constituents of the hot exhaust gas flowing through the catalytic converter are oxidized in the presence of the available oxygen. In this way, both hydrocarbons and carbon monoxide and also NO which is present are converted at least partially to form $CO_2$, $H_2O$ and $NO_2$. The oxidative action is imparted by noble metals which are provided. Suitable embodiments may be gathered from the applications DE10308288, DE19614540, DE19753738, DE3940758, EP427970, DE 4435073. Use may be made, for example, of common DOCs with a catalyst which has an oxidizing action and which is based on noble metals selected from the group comprising Pt, Pd, Au, Ag, or mixtures thereof, on a substrate material. It is however preferable for the DOC (5) to have no noble metals other than platinum, palladium or mixtures thereof. Here, the coating may be provided in multiple layers and/or in zones on the substrate. The oxidation catalytic converter (5) and in particular the catalyst coating may preferably have platinum and/or palladium, particularly preferably platinum and palladium as catalytically active components, advantageously in a mol ratio of between 15:1 and 1:3, in particular between 15:1 and 1:1. Examples of catalyst coatings which have an oxidizing action are also found in the abovementioned patent applications.

With regard to advantageous substrate material to be used for the said oxidation catalytic converter (5), reference is made to EP 0800856 and the literature cited therein. The substrate described here comprises a zeolite mixture of multiple zeolites from the group comprising aluminium silicate, aluminium oxide and titanium oxide, wherein the aluminium silicate has a weight ratio of silicon dioxide/aluminium oxide of 0.005 to 1, preferably 0.01 to 0.5, particularly preferably 0.05 to 0.1, wherein the platinum group metals may advantageously be deposited only on the further metal oxides. In a preferred embodiment, the catalyst comprises the active metals, in particular platinum and/or palladium, on an aluminium silicate and up to five different zeolites. The zeolites may be selected from the group comprising mordenite, H-ZSM5, Na-ZSM5, Y zeolite, dealuminified Y zeolite (DAY) and β zeolite. Here, the concentration of the platinum group metals on the oxidic substrate materials may be between 0.1 and 5 wt % in relation to the substrate material. A range from 0.5-4 wt % is preferable, and a range of 1.5-3.8 wt % is particularly preferable. A further example in this connection is U.S. Pat. No. 6,767,855. Said document and the cited documents describe single- and multi-layer catalytic converters which comprise zeolites as hydrocarbon-absorbing material and also catalytically active noble metals of the platinum group (platinum, palladium, rhodium, iridium and ruthenium), which are preferably deposited on aluminium oxide. The hydrocarbon-absorbing zeolites are preferably arranged in a separate layer deposited directly on a substrate body. The zeolites may be coated with the noble metals such as palladium or silver. The further catalyst coatings are applied to said absorbing layer and may also have a cerium-containing oxide in addition to the aluminium oxide activated by the platinum group metals. U.S. Pat. No. 6,756,336 and also U.S. Pat. No. 6,767,855 describe single- and multi-layer catalysts which are suitable for the invention and which have zeolites as hydrocarbon-absorbing materials. Where it is stated that the diesel oxidation catalytic converter is not capable of storing nitrogen oxides, this statement relates preferably only to the ability for nitrogen oxides to be bound in the form of nitrates.

The oxidation catalytic converter (5) is situated on a substrate provided therefor. It is advantageous for so-called flow-through monoliths (throughflow monoliths) to be provided. Such monoliths are common catalytic converter substrates in the prior art, and may be composed of metal or ceramic materials. Use is preferably made of fireproof ceramics such as for example cordierite. The flow-through monoliths composed of ceramic usually have a honeycomb-like structure composed of continuous ducts, as a result of which flow-through monoliths are also referred to as duct-flow or throughflow monoliths. The exhaust gas can flow through the ducts and, here, comes into contact with the duct walls which are coated with the catalytically active substance. The number of ducts per unit area is characterized by the cell density, which is usually between 300 and 900 cells per square inch (cpsi). The wall thickness of the duct walls is between 0.5 and 0.05 mm in the case of ceramics.

In the present exhaust-gas purification system, a particle filter (6) is situated downstream of the diesel oxidation catalytic converter (5) but upstream of the low-pressure EGR line (14). As embodiments of the particle filter (6) used according to the invention, use may be made of all filter bodies composed of metal and/or ceramic materials which are common in the prior art. These include for example metallic fabric and mesh filter bodies, sintered metal bodies, and foam structures composed of ceramic materials. Use is preferably made of porous wall-flow filter substrates composed of cordierite, silicon carbide or aluminium titanate. Said wall-flow filter substrates have inflow and outflow ducts, wherein in each case the outflow-side ends of the inflow ducts and the inflow-side ends of the outflow ducts are closed off, in an alternating fashion, by gas-tight "plugs". Wall-flow filters (wall-flow filter substrates) of said type are preferably used as substrates. In these, the exhaust gas which is to be purified and which flows through the filter substrate is forced to pass through the porous wall between the inflow and outflow duct, which results in an excellent particle filtering action. The filtration characteristic for particles can be configured by means of the porosity, the pore/radius distribution and the thickness of the wall. The storage material and possibly the catalyst material may be present in the form of coatings in and/or on the porous walls between inflow and outflow ducts. Use may also be made of filters which have been extruded from the corresponding storage and/or catalyst materials directly or with the aid of binders, that is to say the porous walls are composed directly of the catalyst material, such as may be the case for example in the case of vanadium-based SCR catalytic converters.

In an advantageous embodiment of the method according to the invention, the particle filter (6) is provided with a catalytic function selected from the group comprising oxidation catalytic converter, SCR catalytic converter, nitrogen oxide storage catalytic converter, three-way catalytic converter. In a particularly advantageous embodiment, the particle filter (6) is coated with said catalyst functions. It is very particularly preferable for the filter to be coated with an oxidation catalytic converter if no further nitrogen oxide aftertreatment is necessary. If nitrogen oxide aftertreatment is required, a coating of the filter with an SCR catalyst is particularly preferable. The coating may be composed of one or more coating materials and catalytic properties and may be applied either over the entire length of the filter or in zones on the inlet side and/or outlet side. Furthermore, the coating may also be applied in multiple layers one on top of the other. With regard to possible embodiments of the particle filter, reference is made in this regard to the literature cited in the introduction, and in particular to EP2283213, DE102009039249, DE102009039250 and to the literature cited therein.

As components or coatings which have an oxidizing action, a person skilled in the art will for example consider those presented in WO2008101585. The particle filter (6) and in particular the discussed coating preferably has metals such as platinum, palladium, rhodium or mixtures thereof, wherein these are then advantageously applied to substrate materials of large surface area. Platinum-palladium mixtures are more preferably used. A person skilled in the art will select the suitable mixing ratio of the metals if appropriate depending on the fraction of species in the exhaust gas which have an oxidizing action, and depending on the temperature regime to be adhered to. The particle filters (6) which have an oxidizing action may preferably have a mol ratio of platinum to palladium of between 15:1 and 0:1, in particular between 15:1 and 1:1. It is very particularly preferable for the oxidizing action of the particle filter (6) to be coordinated with the oxidizing activity of the diesel oxidation catalytic converter (5) within the meaning of EP2123345.

It may also be expedient for so-called catalysts with 3-way function to be applied as catalytically active coatings to the filter (6), which catalysts exhibit high conversion rates for hydrocarbons, carbon monoxide and nitrogen oxide both under lean and also stoichiometric exhaust-gas conditions. The mode of operation and suitable configuration of 3-way catalysts is described in detail for example in EP1046423 and WO95/35152.

In a further embodiment of the invention, the catalytic action, preferably the coating of the particle filter (6), may also have a function for storing nitrogen oxides and/or oxygen under lean exhaust-gas conditions. The advantage of such a $NO_x$ storage function (NSC, NOx storage catalyst, LNT) or oxygen storage function (OSC—oxygen storage component) in the component (6) is that the nitrogen oxides contained in the exhaust gas can be filtered out already at low exhaust-gas temperatures, and can, at higher temperatures, be desorbed from the storage centres and converted on an SCR catalytic converter (as (7) and/or (8)) possibly positioned downstream (as described in WO2004076829). For the storage of the nitrogen oxides as nitrates, use is made of base oxides, carbonates or hydroxides of alkali metals, alkaline earth metals and rare earth metals, in particular base compounds of barium and strontium and of cerium. The $NO_x$ storage preferably has the components selected from the oxides of cerium, barium or strontium or mixtures thereof. It is advantageous in particular that, by means of corresponding NOx storage functionalities, the stored NO2 can react in rich exhaust gas to form N2. Accordingly, in the phase of overrun operation, when an air-fuel mixture of ≤1 is set and the exhaust gas is conducted through the engine cyclically according to the invention, the stored nitrogen oxides are reduced significantly more effectively. There are accordingly at least no NOx or NH3 peaks such as occur in normal NOx storage catalytic converter arrangements.

As has just been explained, the reactivation of the diesel oxidation catalytic converter (5) is carried out at a time at which the engine is not performing any positive work, and at which therefore normally no fuel is being supplied to the engine, but at which the engine is nevertheless being turned over, driven by the (inert or heavy) mass of the vehicle. This is the case when the engine is in so-called overrun operation. This is present for example at the onset of a deceleration phase, for example owing to braking—possibly engine braking—of the vehicle, that is to say when the speed of the vehicle is decreasing and fuel is no longer being supplied to the engine (so-called overrun fuel cut-off). In this phase, the engine is however still coupled to the gearbox, and a gear is engaged. Here, normally only air is pumped via the intake tract into the exhaust system by the engine which is turning over. Such an operating mode arises for example when approaching a red traffic light or when rapidly approaching a slower-moving vehicle.

In hybrid drives in which not only the internal combustion engine but also electric motors are used for driving the vehicle, overrun operation of the internal combustion engine may also be generated in other driving states in order to utilize this for the reactivation, according to the invention, of the catalytic converter (5). Here, the internal combustion engine may be switched to overrun operation even while the vehicle is at a standstill or while the vehicle is being driven, by virtue of the internal combustion engine and possibly also the vehicle being driven by the electric motor. Here, the overrun operation of the engine is thus effected by the electric motor. In the case of hybrid drives, it is thus possible for the reactivation according to the invention of the oxidation catalytic converter to be extended to all driving situations in which the drive power of the electric motor is adequate for driving the vehicle and the internal combustion engine. This is the case in particular in urban driving situations.

In a further preferred embodiment of the invention, overrun operation is to be understood to mean that the engine, upon being shut down or during the shutting-down process, is briefly switched to rich exhaust gas and a high low-pressure EGR rate in the above-described way in order to flush the diesel oxidation catalytic converter (5) with rich exhaust gas during the engine shut-down and thereby at least partially reactivate said diesel oxidation catalytic converter. For the shut-down of the engine, the conversion of heat into mechanical work (induced power) must be reduced to such an extent that said power is no longer sufficient to fully overcome the friction losses of the engine. This is generally realized by virtue of the generation of heat in the cylinder during the working stroke being prevented. In the case of applied-ignition engines, this was previously realized by deactivating the ignition (ignition spark). In diesel engines and modern applied-ignition engines, this is realized by shutting off the fuel supply. In the situation according to the invention, the generation of heat in the cylinder is realized by shutting off the air/oxygen supply while the fuel supply is initially maintained. Here, the continued rotation of the engine with the gearbox decoupled may additionally be assisted and prolonged either by means of the starter or by means of an electric motor (hybrid drive). This may take place either during the shutting-down of the engine or, in a vehicle with start/stop functionality, while the vehicle is at a standstill, when the engine automatically shuts down. The enrichment with a high low-pressure EGR rate, as described above, can therefore preferably be commenced during the overrun operation of the engine and possibly merge seamlessly into the shut-down of the engine.

It is preferable according to the invention if, in said phases of the reactivation in overrun operation, the low-pressure EGR valve is completely opened in order to conduct as large an exhaust-gas flow as possible of at least 50%, preferably at least 80% and particularly preferably approximately 100% in a circuit via the low-pressure EGR line (14), the engine (1) and the oxidation catalytic converter (5) and particle filter (6). To attain a high low-pressure EGR rate, it is possible at the same time for the other valves (10) and/or (11) to be closed to a greater or lesser extent. Furthermore, the exhaust-gas flow which is not conducted via the low-pressure EGR line can be recirculated via the high-pressure EGR line (15). The recirculation of the exhaust gas via the low-pressure and high-pressure EGR lines may then be used when the flow resistance of the exhaust gas is to be reduced in order to minimize the braking of the engine.

The air/fuel ratio (lambda) to be set during the reactivation should have a value of less than or equal to 1 ($\lambda \leq 1$). The air/fuel ratio may be measured by means of known lambda sensors or oxygen sensors or NOx sensors ("Handbuch Verbrennungsmotor" ["Internal Combustion Engine Handbook"], van Basshuysen/Schäfer, ISBN 3-528-13933-1) or may be calculated by the engine control unit. Depending on the lambda sensor, the signal is output in mV or as a lambda value. According to the invention, the value lambda ($\lambda$) is to be regarded as being defined as a number describing the mixture composition composed of air and fuel. Other expressions in this context are air ratio, air ratio number, air number, excess air and excess air number.

The combustion air ratio places the air mass $m_{L,act}$ actually available for combustion in a ratio with respect to the minimum required stoichiometric air mass $m_{L,st}$ needed for a complete combustion:

$$\lambda = \frac{m_{L,act}}{m_{L,st}}$$

If $\lambda=1$, then the ratio is a stoichiometric combustion air ratio where $m_{L,act}=m_{L,st}$; this is the case if all the fuel molecules can theoretically react completely with the air oxygen without there being a lack of oxygen and without there being any remaining unburned oxygen.

For internal combustion engines:

$\lambda<1$ (e.g. 0.9) means "lack of air": rich mixture $\lambda>1$ (e.g. 1.1) means "excess of air": lean mixture Statement: $\lambda=1.1$ means that 10% more air participates in the combustion than would be required for a stoichiometric reaction. This is simultaneously the excess of air. It is however preferable during the reactivation for an air/fuel mixture to be maintained which corresponds to a lambda value of 0.8 to 1. It is particularly preferable for said value to lie between 0.85 and 0.99, very particularly preferably between 0.95 and 0.99.

In one particular embodiment, environmental data of the vehicle is taken into consideration for calculating the onset and the duration of the overrun operation of the engine and the regeneration of the nitrogen oxide storage catalytic converter, for example when the vehicle is approaching a red traffic light or a speed limit. Furthermore, use may for example be made of navigation data (GPS) or distance sensors to predict the onset or end of the overrun operation and thus make the regeneration as efficient as possible.

The method according to the invention for reactivation may particularly advantageously be carried out using the following system for purifying the exhaust gases of a lean-burn engine. Here, the system has the following features:

a unit for controlling the engine and the regulating devices of the system;

a device for throttling the intake air (11);

a first sensor for detecting the air/fuel ratio or NOx sensor (12);

an oxidation catalytic converter (5) which is not capable of storing nitrogen oxides;

an apparatus for injecting reducing agent into the exhaust tract (19);

a possibly catalytically active particle filter (6);

a second sensor for detecting the air/fuel ratio or NOx sensor (13);

a low-pressure EGR line (14) having a low-pressure EGR valve (9);

optionally, a device for reducing the discharge of the exhaust gas (10).

It is pointed out that the further and preferred embodiments specified for the system and for the method according to the invention apply correspondingly, mutatis mutandis, to both aspects of the invention.

In a further advantageous embodiment, a catalytic converter (7) which has properties selected from the group comprising oxidation catalytic converter, SCR catalytic converter, NOx storage catalytic converter, hydrocarbon storage, three-way catalytic converter is arranged downstream of the particle filter (6) and upstream of the low-pressure EGR line (14). Said optional catalytic converter (7) is, like the particle filter (6), situated within the low-pressure EGR circuit and can thus continue to catalytically convert or adsorb the reactivation products during the reactivation of the oxidation catalytic converter (5). The catalytic converter (7) is particularly preferably an SCR catalytic converter with an ammonia storage function, because any ammonia formed or desorbed during the reactivation can be stored again by said catalytic converter. This yields a further possibility for improved reduction of the nitrogen oxides, by means of the increased formation of ammonia across a nitrogen oxide storage catalytic converter, which is connected to the particle filter (6), during the reactivation by means of the method according to the invention. This situation can be utilized in order to fill an ammonia storage in (7) with ammonia possibly formed during the reactivation, and to utilize said ammonia during the subsequent lean operation for additional NOx reduction across the SCR catalytic converter (7). It is however also possible for an injection device for ammonia, or for a precursor compound which produces ammonia, to be provided upstream of the SCR catalytic converter. In this way, an almost complete nitrogen oxide reduction in the exhaust gas is attained across the SCR catalytic converter (7) by comproportionation of NH3 and NOx. In the approach proposed here, during the overrun operation of the engine and with throttling of the intake air by means of the valve (11) and/or reduction of the discharge of the exhaust gases by means of the valve (10), the exhaust gas is substantially conducted in a circuit through the low-pressure EGR valve (9) via the engine (1) and the diesel oxidation catalytic converter (5), the particle filter (6) and the SCR catalytic converter (7), and during this time an air-fuel mixture is set which corresponds to a lambda value of ≤1. For said embodiment of the invention, there is particularly preferably a suitable system according to the invention as described above, in which the SCR catalyst is applied to the particle filter (6) and/or the optional catalytic converter (7), and an injection device for a reducing agent such as for example ammonia, or a precursor compound (19) which produces ammonia, is provided, depending on requirements, either upstream or downstream of the DPF (6).

Particularly preferable is a system in which a further catalytic converter (8) which has properties selected from the group comprising oxidation catalytic converter, SCR catalytic converter, NOx storage catalytic converter, ammonia-blocking catalytic converter, three-way catalytic converter is situated in the exhaust tract downstream of the low-pressure EGR line (14). Said optional catalytic converter (8) is located outside the low-pressure EGR circuit and may, if it is formed for example as an oxidation catalytic converter corresponding to catalytic converter (5), serve to oxidize reducing agent which is incompletely burned after the reactivation. For this purpose, the catalytic converter (8) should have catalytic properties which permit both the oxidation of the reducing agent, such as for example Pt, Pd, Rh, Ag, Au, Fe, Cu, Co and Ni, and also oxygen storage materials such as rare earth metal compounds for example of cerium, praseodymium, neodymium and yttrium, which can utilize the stored oxygen to convert the reducing agent even in only briefly substoichiometric exhaust gas. Suitable embodiments of such a catalytic converter have already been described above with regard to three-way catalytic converters (TWC).

As a result of the positioning of said catalytic converter (8) remote from the engine, and the resulting low exhaust-gas temperatures, an activity is likewise particularly advantageous which effects an adsorption of exhaust-gas components, such as for example:

the adsorption of hydrocarbons for example in the hydrocarbon storage or oxidation catalytic converter during the cold start of the engine or during the reactivation of the nitrogen oxide storage catalytic converter or particle filter;

the adsorption of nitrogen oxides for example in the NOx storage catalytic converter in order to attain a further improvement in NOx conversion, primarily at engine operating points with elevated exhaust-gas temperatures at which the possibly provided NOx storage activity of the particle filter (5) and/or the low-pressure EGR is no longer adequate for efficient nitrogen oxide reduction;

the adsorption of ammonia for example in the SCR catalytic converter in order to capture ammonia formed during the reactivation of the nitrogen oxide storage catalytic converter.

The catalytic converter (8) very particularly preferably has an SCR catalytic converter and/or ammonia-blocking catalytic converter.

Catalytically active coatings with different functions may be applied in zones and/or in layers on the optional catalytic converters (7) and (8) and on the oxidation catalytic converter (5) and on the particle filter (6), wherein the coatings for the catalytic converters (7), (8) and (5) are particularly preferably applied to a honeycomb-like substrate body referred to in general as a throughflow monolith.

The regulation of the reactivation is realized by means of an electronic control unit (ECU) in the vehicle.

To improve the reactivation efficiency of an oxidation catalytic converter at low exhaust-gas temperatures (≤350° C., preferably ≤250° C., particularly preferably ≤200° C.), according to the invention, in an exhaust system of a lean-burn engine comprising an oxidation catalytic converter (5) and a possibly catalytically active DPF (particle filter) (6) and a device for low-pressure exhaust-gas recirculation (EGR), the duration of the reactivation is lengthened, without significantly increasing fuel consumption or HC/CO emissions, by the implementation of, for example, the following method according to the invention:

1. The lean-burn engine (1) is operated with a lean combustion mixture (normal operation) and the exhaust gas is conducted through the oxidation catalytic converter (5) and a possibly coated particle filter (6), wherein HC, CO and particles are as completely as possible removed from the exhaust gas.

2. When the oxidation catalytic converter (5) must be regenerated in order to restore its purification efficiency, a phase of driving operation in which the engine is in overrun operation is utilized for this purpose. During said phase (operation during which normally no fuel is injected into the engine), advantageously 100% of the exhaust gas is recirculated to the engine. This is achieved in that, at the start of the phase, the low-pressure EGR valve (9) is opened, the fuel supply for generating work is ended, and at the same time either the throttle flap (11) for the intake air or else the exhaust-gas flap (10) are almost completely closed. The sequence and speed of adjustment of the control elements are preferably configured in accordance with the respective driving situation such that undesired pressure surges, noises and vibrations can be avoided or reduced. At the same time, the required fuel quantity for attaining the reactivation lambda value is advantageously calculated from the variables: volume of the circuit path, and present state of the gas situated in the circuit path (such as pressure, temperature and lambda). Furthermore, it is preferable for the fuel quantity required for the reactivation of the oxidation catalytic converter (5) and/or for the reactivation of the particle filter (6) and of the possibly stored oxygen to be calculated. The two calculated fuel quantities are dosed in parts and/or in steps or in their entirety into the circuit path preferably via one or more fuel nozzles (12). The injection of fuel is then ended.

3. The rich exhaust gas is now conducted in a circuit via the oxidation catalytic converter (5) and the filter (6), and if required, for example in the event of an increase of lambda to values greater than 1, further fuel can be injected. The required fuel quantity can be determined from the lambda value upstream of the oxidation catalytic converter (5) and/or downstream of the oxidation catalytic converter (5) and from the volume of the circuit path. The end of the reactivation is reached upon complete reactivation of the oxidation catalytic converter (5) or possibly of the particle filter (6), when the idle rotational speed is reached, when the engine comes to a stop, or when there is a demand for power from the engine.

4. When the end of the reactivation has been reached, the exhaust-gas flap (10) and/or throttle flap (11) is opened again, the low-pressure EGR rate is reduced by adjusting the valve (9), and the combustion mixture is set back to lean operation. To prevent the exhaust gas which is conducted in the circuit and which is enriched with reducing agents from being discharged completely and abruptly to the ambient air, which would result in a significant increase in HC and CO emissions, the following method is proposed: after the end of the reactivation, there is admixed into the low-pressure gas circuit only such an amount of fresh air that the mixture just becomes slightly lean, wherein furthermore a high EGR rate of over 80%, preferably over 90% and particularly preferably over 95% is maintained until advantageously the excess reducing agent has for the most part been depleted across the catalytic converter (5, possibly 6, possibly 7). Only thereafter does the complete switch to normal lean operation take place. The sequence and speed of adjustment of the control elements are preferably configured in accordance with the respective driving situation such that undesired pressure surges, noises and vibrations are avoided or reduced.

Furthermore, the driving characteristics should as far as possible not be adversely affected during the reactivation, because according to the invention, the reactivation takes place when the engine does not need to perform work. This also reduces the risk of oil thinning during the reactivation.

The method may be used even at relatively high exhaust-gas temperatures. Advantages here are:

Lower fuel consumption during the reactivation.

Reduced generation of exothermic heat during the reactivation, and resulting reduced risk of irreversible deactivation of the catalytic converters.

Reduction of hydrocarbon and CO emissions during the reactivation as a result of more efficient conversion of the reducing agent.

As a result of the more efficient reactivation of the DOC (5) according to the present invention, it is possible to save on noble metal in the system, because otherwise relatively high amounts of noble metal are required to be able to adhere to the demanded HC and CO limit values even at low exhaust-gas temperatures. Furthermore, the driving characteristics are not adversely affected during the reactivation, and oil thinning is minimized. Against the background of the known prior art, this was not to be expected.

Figure 2:
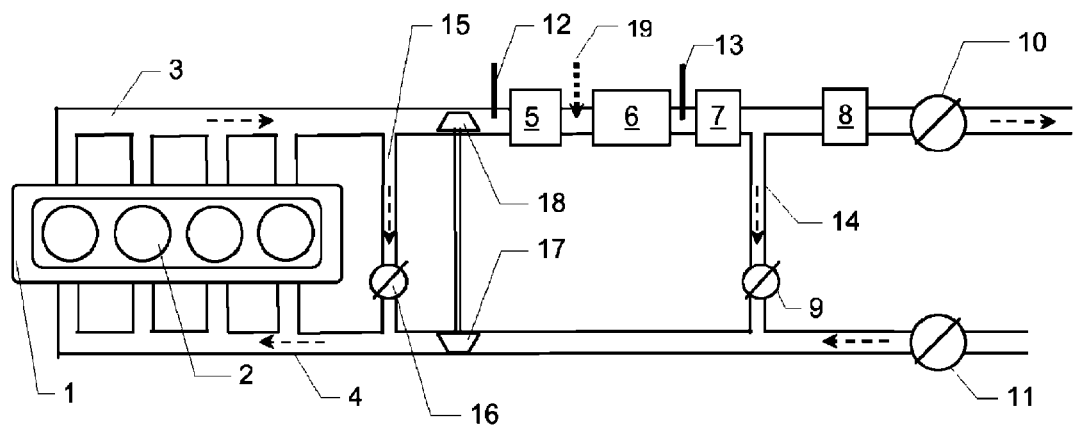

FIG. 1 and FIG. 2 show two possible system layouts by way of example.

1) Engine
2) Cylinder
3) Exhaust system
4) Air intake system
5) Oxidation catalytic converter
6) Particle filter
7) Optional catalytic converter
8) Optional catalytic converter (may also be arranged downstream of (10))
9) Low-pressure EGR valve
10) Exhaust-gas flap
11) Throttle flap
12) Sensor for detecting the air fuel ratio, for example lambda sensor or NOx sensor (may also be arranged downstream of (5))
13) Sensor for detecting the air fuel ratio, for example lambda sensor or NOx sensor (may also be arranged downstream of (7) or (8))
14) Low-pressure EGR line
15) High-pressure EGR line
16) High-pressure EGR valve
17) Compressor of the turbocharger
18) Turbine of the turbocharger
19) Apparatus for injecting reducing agent into the exhaust tract (may also be arranged downstream of (6) or (7))

The invention claimed is:

1. A method for reactivating an oxidation catalytic converter which is not capable of storing nitrogen oxides and which is arranged in an exhaust line of a lean-burn engine, the engine being provided with an exhaust-gas discharge valve and/or an air intake valve, and a low-pressure EGR valve arranged in a low-pressure EGR line, the method comprising commencing reactivation of the oxidation catalytic converter during an overrun operation of the engine in such a way that, with throttling of the intake air by the air intake valve and/or reduction of the discharge of the exhaust gases by the exhaust-gas discharge valve, a rate of exhaust gas recirculation is increased and the exhaust gas is substantially recirculated in a circuit through the low-pressure EGR valve via the engine, the oxidation catalytic converter, and a particle filter, wherein during reactivation of the oxidation catalytic converter, an air-fuel mixture is set to a lambda value of $\leq 1$.

2. The method according to claim 1, wherein the oxidation catalytic converter comprises platinum and/or palladium as catalytically active components.

3. The method according to claim 1, wherein the particle filter is active as at least one of an oxidation catalytic converter, an SCR catalytic converter, a nitrogen oxide storage catalytic converter, and a three-way catalytic converter.

4. The method according to claim 1, wherein the lean-burn engine is arranged in a vehicle, and the overrun operation of the engine is realized under an action of the mass of the vehicle.

5. The method according to claim 1, wherein the overrun operation of the engine is realized via an electric motor.

6. The method according to claim 1, wherein the method is carried out during a shutting-down of the engine.

7. The method according to claim 1, wherein during reactivation of the oxidation catalytic converter the low-pressure EGR valve is fully open.

8. The method according to claim 1, wherein during the reactivation of the oxidation catalytic converter an air-fuel mixture is maintained at a lambda value of 0.8 to 1.

9. The method according to claim 1, wherein the lean-burn engine is arranged in a vehicle, and environmental data of the vehicle is taken into consideration for calculating an onset and a duration of the overrun operation of the engine and the reactivation of the oxidation catalytic converter.

10. The method according to claim 1, wherein the engine is provided with the exhaust-gas discharge valve arranged in an exhaust tract downstream from an inlet to the low-pressure EGR line.

11. The method according to claim 1, wherein the reactivation of the oxidation catalytic converter is commenced during an overrun operation of the engine in which the engine does no positive work.

12. The method according to claim 1, further comprising
during reactivation of the oxidation catalytic converter, introducing a reducing agent to the exhaust gas; and
after reactivation of the oxidation catalytic converter, depleting excess reducing agent by introducing fresh air to the exhaust gas while maintaining a partial recirculation of the exhaust gas via the circuit through the low-pressure EGR valve.

13. A system for purifying the exhaust gases of a lean-burn engine, comprising:
an electronic control unit;
an air intake valve;
a first air/fuel ratio sensor;
an oxidation catalytic converter;
an injector that injects reducing agent into an exhaust line;
a particle filter coated with an SCR catalyst;
a second air/fuel ratio sensor;
a low-pressure EGR line having a low-pressure EGR valve; and
optionally, an exhaust-gas discharge valve, wherein
the electronic control unit is configured to control the system such that:
reactivation of the oxidation catalytic converter is commenced during an overrun operation of the engine in such a way that, with throttling of the intake air by the air intake valve and/or reduction of the discharge of the exhaust gases by the exhaust-gas discharge valve, a rate of exhaust gas recirculation is increased and the exhaust gas is substantially recirculated in a circuit through the low-pressure EGR valve via the engine, the oxidation catalytic converter, and a particle filter, and
during reactivation of the oxidation catalytic converter, an air-fuel mixture is set to a lambda value of ≤1.

14. The system according to claim 13, wherein at least one of the first and second air/fuel ratio sensors is an NOx sensor.

15. The system according to claim 13, wherein
the oxidation catalytic converter is not capable of storing nitrogen oxides.

16. The system according to claim 13, wherein
the electronic control unit is configured for controlling a diesel engine;
the oxidation catalytic converter is a diesel oxidation catalytic converter; and
the particle filter is a diesel particle filter.

17. The system according to claim 13, further comprising
a further catalytic converter which is active as at least one of an oxidation catalytic converter, an SCR catalytic converter, an NOx storage catalytic converter, a three-way catalytic converter, and an ammonia-blocking catalytic converter,
wherein the further catalytic converter is arranged in an exhaust tract downstream of an inlet to the low-pressure EGR line.

18. The system according to claim 17, wherein the further catalytic converter is an SCR catalytic converter and/or an ammonia-blocking catalytic converter.

19. The system according to claim 13, further comprising
a further catalytic converter which is active as an oxidation catalytic converter, an SCR catalytic converter, a nitrogen oxide storage catalytic converter, a hydrocarbon storage, or a three-way catalytic converter,
wherein the further catalytic converter is arranged in an exhaust tract downstream of the particle filter and upstream of an inlet to the low-pressure EGR line.

20. The system according to claim 19, wherein the further catalytic converter is an SCR catalytic converter.

21. The system according to claim 19, further comprising
a third catalytic converter which is active as at least one of an oxidation catalytic converter, an SCR catalytic converter, an NOx storage catalytic converter, a three-way catalytic converter, and an ammonia-blocking catalytic converter,
wherein the third catalytic converter is arranged in an exhaust tract downstream of the inlet to the low-pressure EGR line.

22. The system according to claim 21, wherein the third catalytic converter is an SCR catalytic converter and/or an ammonia-blocking catalytic converter.

23. A method of assembling an exhaust system, comprising:
joining the system of claim 13 with a lean-burn engine.

* * * * *